(12) United States Patent
VanBlon et al.

(10) Patent No.: US 10,235,536 B2
(45) Date of Patent: Mar. 19, 2019

(54) RELATIONSHIP-BASED IMAGE MODIFICATION

(71) Applicant: LENOVO (Singapore) PTE. LTD., New Tech Park (SG)

(72) Inventors: Russell Speight VanBlon, Raleigh, NC (US); John Carl Mese, Cary, NC (US); Nathan J. Peterson, Oxford, NC (US); Arnold S. Weksler, Raleigh, NC (US)

(73) Assignee: Lenovo (Singapore) PTE LTD, New Tech Park (SG)

( * ) Notice: Subject to any disclaimer, the term of this patent is extended or adjusted under 35 U.S.C. 154(b) by 147 days.

(21) Appl. No.: 15/297,920

(22) Filed: Oct. 19, 2016

(65) Prior Publication Data

US 2018/0107842 A1   Apr. 19, 2018

(51) Int. Cl.
*G06F 21/62* (2013.01)
*H04L 12/58* (2006.01)
*G06T 11/60* (2006.01)

(52) U.S. Cl.
CPC .......... *G06F 21/6254* (2013.01); *H04L 51/10* (2013.01); *H04L 51/32* (2013.01); *G06T 11/60* (2013.01); *G06T 2207/20144* (2013.01)

(58) Field of Classification Search
CPC ..... G06F 21/10; G06F 21/6254; H04L 63/20; H04L 63/102
See application file for complete search history.

(56) References Cited

U.S. PATENT DOCUMENTS

2011/0314528 A1* 12/2011 Dolin ..................... G06Q 50/01
  726/7
2016/0134638 A1* 5/2016 Tulshibagwale ...... H04L 63/105
  726/4

* cited by examiner

*Primary Examiner* — Dao Q Ho
(74) *Attorney, Agent, or Firm* — Kunzler, PC (57) ABSTRACT

For relationship-based image modification, a processor determines a relationship level for a requester of an image of a plurality of images. The processor further modifies the image based on the relationship level.

13 Claims, 9 Drawing Sheets

| User Identifier 250 | Relationship Level 255 |
|---|---|
| User Identifier 250 | Relationship Level 255 |
| User Identifier 250 | Relationship Level 255 |
| User Identifier 250 | Relationship Level 255 |

251 labels point to each row.

RELATIONSHIP-BASED IMAGE MODIFICATION

FIELD

The subject matter disclosed herein relates to image modification and more particularly relates to relationship-based image modification.

BACKGROUND

Description of the Related Art

Images on social media and other platforms may be available to users with a wide variety of relationships to the submitter and/or subject of the image.

BRIEF SUMMARY

An apparatus for relationship-based image modification is disclosed. The apparatus includes an image storage system, a processor, and a memory. The image storage system stores a plurality of images. The memory stores code that is executable by the processor. The processor determines a relationship level for a requester of an image of the plurality of images. The processor further modifies the image based on the relationship level. A method and program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
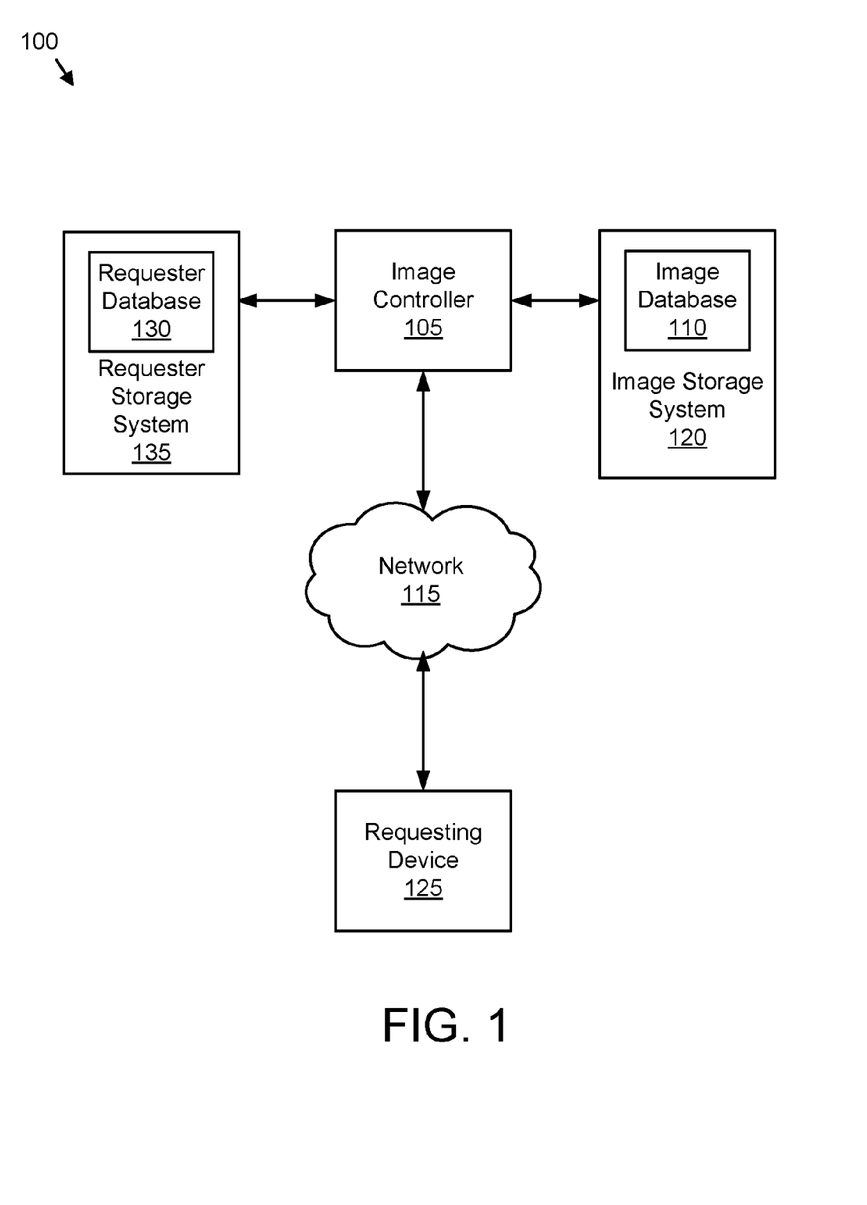
FIG. 1 is a schematic block diagram illustrating one embodiment of an image modification system.

FIG. 1 is a schematic block diagram illustrating one embodiment of an image modification system 100. In the depicted embodiment, the image modification system 100 includes a requester storage system 135, an image controller 105, an image storage system 120, a network 115, and a requesting device 125. The requester storage system 135 may store a requester database 130. The image storage system 120 may store an image database 110.

A submitter may submit one or more images to the image database 110. An image may have one or more subjects. The image controller 105 may provide requested images as part of the social media site, a social media feed, or the like. A requester may use the requesting device 125 to request an image from the image controller 105. The requesting device 125 may be a computer, a mobile telephone, a tablet computer, or the like.

The image controller 105 may provide the requested image to the requesting device 125. Unfortunately, all aspects of the requested image may be made available to the requester, regardless of the relationship between the requester and the submitter and/or subjects of the image. As a result, aspects of the image may be made available to the requester that the submitter and/or subject would not wish to have shared.

The embodiments described herein determine a relationship level for the requester of the image and modify the image based on the relationship level. As a result, aspects of the image are not provided to some requesters based on the relationship level, preserving the submitter's and/or subject's privacy for those image aspects.

Figure 2A:
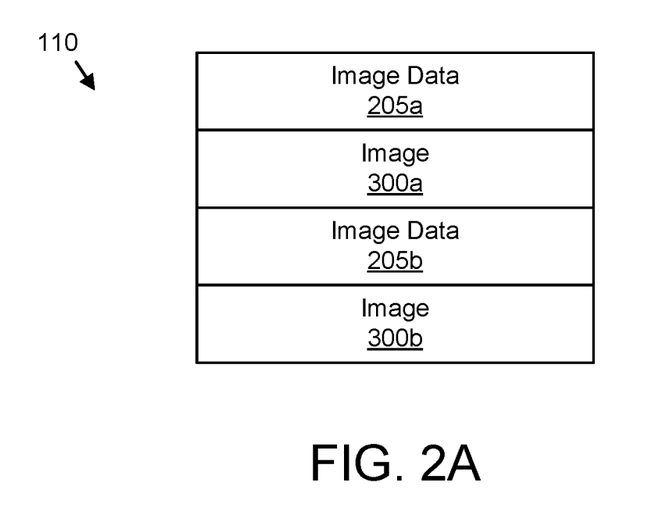
FIG. 2A is a schematic block diagram illustrating one embodiment of an image database.

FIG. 2A is a schematic block diagram illustrating one embodiment of the image database 110. The image database 110 may be organized as one or more data structures stored by the image storage system 120. The image database 110 stores image data 205 and corresponding images 300. The image database 110 may store image data 205 for a plurality of images 300.

Figure 2B:
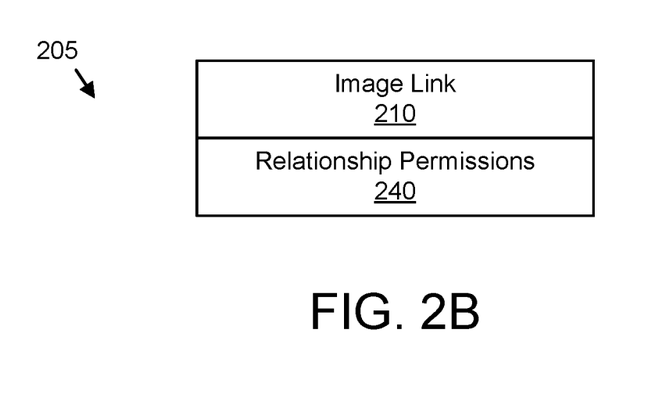
FIG. 2B is a schematic block diagram illustrating one embodiment of image data.

FIG. 2B is a schematic block diagram illustrating one embodiment of image data 205. The image data 205 may be organized as one or more data structures. In the depicted embodiment, the image data 205 includes an image link 210 to a corresponding image 300. In addition, the image data 205 includes relationship permissions 240.

In one embodiment, the relationship permissions 240 indicate which aspects of the corresponding image 300 may be communicated to the requesting device 125 as a function of the relationship level of the requester to the submitter. In addition, the relationship permissions 240 may indicate which aspects of the corresponding image 300 may be communicated to the requesting device 125 as a function of the relationship level of the requester to subjects of the image.

In one embodiment, relationship permissions 240 are determined for both a submitter and one or more subjects of the image. The most restrictive permissions may be used. Alternatively, the permissions for the submitter may be used.

Figure 2C:
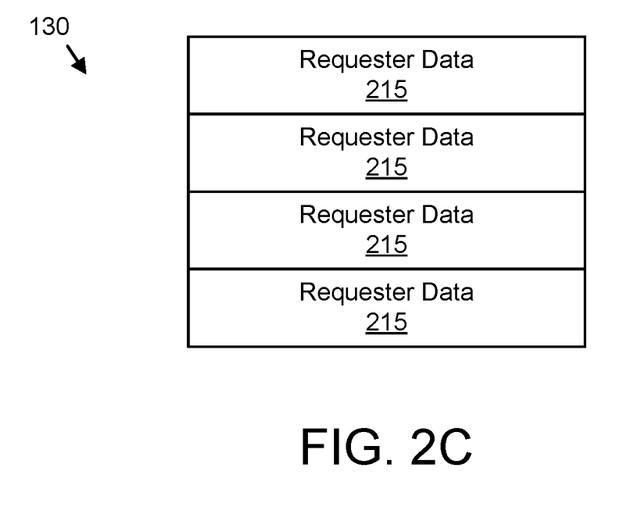
FIG. 2C is a schematic block diagram illustrating one embodiment of a requester database.

FIG. 2C is a schematic block diagram illustrating one embodiment of the requester database 130. The requester database 130 may be organized as one or more data structures in the requester storage system 135. The requester database 130 may include requester data 215 for one or more requesters.

Figure 2D:
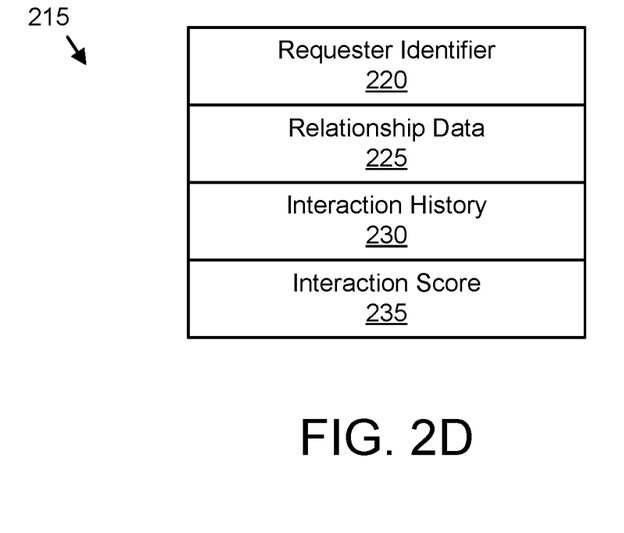
FIG. 2D is a schematic block diagram illustrating one embodiment of requester data.

FIG. 2D is a schematic block diagram illustrating one embodiment of the requester data 215. The requester data 215 may be organized as one or more data structures. In the depicted embodiment, the requester data 215 includes a requester identifier 220, a relationship data 225, an interaction history 230, and an interaction score 235.

The requester identifier 220 may identify the requester. The requester identifier 220 may include a name, an alphanumeric identification code, contact information including an email address and/or telephone number, and the like.

The relationship data 225 may describe the relationship between the requester and other users of the system 100 such as submitters and/or subjects of images 300. The relationship data 225 is described in more detail in FIG. 2E.

The interaction history 230 may record interactions of the requester with one or more users of the system 100. For example, the interaction history 230 may record interactions of the requester with the submitter of an image 300. In addition, the interaction history 230 may record interactions of the requester with subjects of the image 300.

The interactions may include communications, views, instances of the requester in images 300 submitted by the submitter, and the like. In one embodiment, the system 100 searches for and records in the interaction history 230 interactions between the requester and a user that occur outside of the system 100.

The interaction score 235 may be calculated as a function of the interaction history 230. An interaction score 235 may be calculated for each of one or more users. In one embodiment, the interaction score IS 235 is calculated using Equation 1, wherein NC is a number of communications from the user to the requester, NS is a number of times the requester appears as a subject in images 300 related to the user, NV is a number of views of images 300 related to the user by the requester, and k1 and k2 nonzero constants.

$$IS=((k1*NC)+(k2*NS))/\sqrt{NV} \qquad \text{Equation 1}$$

For example, if the user sends six communications to the requester and the requester appears in 20 images 300 where the user is also a subject and/or submitter, then NC=6 and NS=20. In addition, if the requester has viewed 60 images in which the user is a submitter and/or a subject, then NV=60.

Figure 2E:
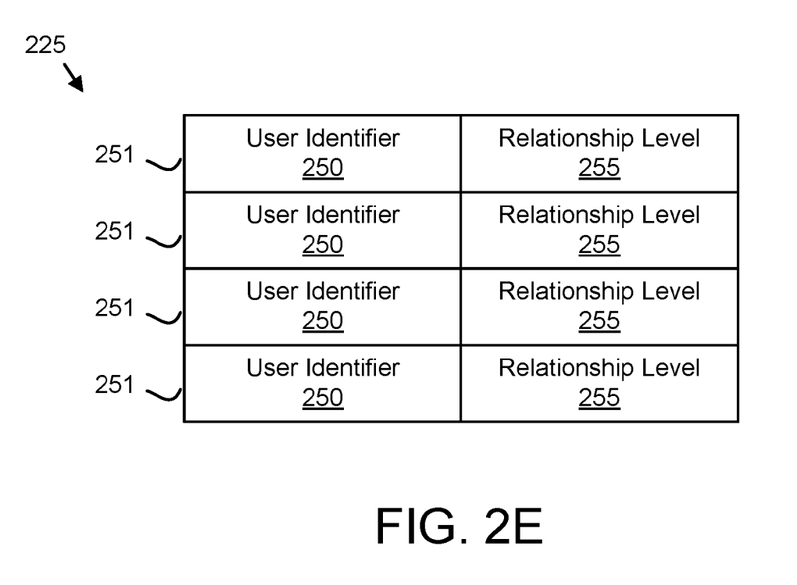
FIG. 2E is a schematic block diagram illustrating one embodiment of the relationship data.

FIG. 2E is a schematic block diagram illustrating one embodiment of the relationship data 225. The relationship data 225 may be organized as one or more data structures. In the depicted embodiment, the relationship data 225 includes one or more entries 251. Each entry 251 includes a user identifier 250 and relationship level 255.

The user identifier 250 may identify a user such as a submitter and/or a subject. The user identifier 250 may comprise a name, an alphanumeric identifier, and/or contact information.

The relationship level 255 may describe the relationship between the user and the requester. In one embodiment, the relationship level 255 is selected from the group consisting of a close relationship level, a family relationship level, an acquaintance relationship level, and a public relationship level. In addition, the relationship level 255 may be calculated as a function of the interaction history 230 of the user with the requester. Alternatively, the relationship level 255 may be calculated as a function of the interaction score 235.

Figure 3A:
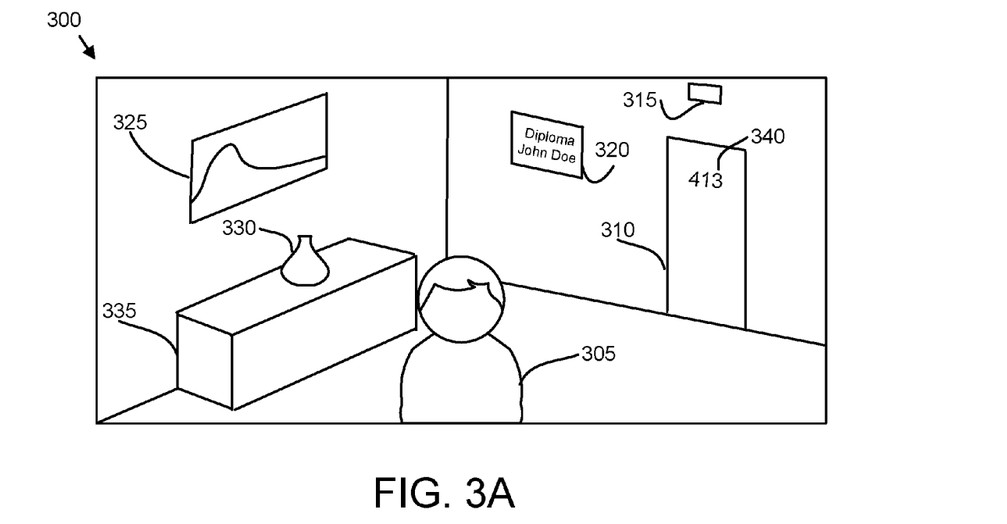
FIG. 3A is a drawing illustrating one embodiment of an image.

FIG. 3A is a drawing illustrating one embodiment of an image 300. In the depicted embodiment, an exemplary image 300 with a number of aspects is shown. The aspects of the exemplary image 300 are not limiting. The image 300 includes a subject 305, a door 310 with a room number 340, furniture 335, a decanter 330, a picture 325, a diploma 320, and a vent 315. The image 330 may have a specified resolution such as 300 dots per inch (dpi).

The room number 340, decanter 330, picture 325, and diploma 320 may identify a time, place, and/or context for the image 300. In addition, the image 300 may include other subjects 305, political preferences, humor preferences, products, consumables, and the like. The submitter may not wish for some aspects of the image 300 such as the time, the place, the contents, and/or the context to be made available to every requester of the image 300.

Figure 3B:
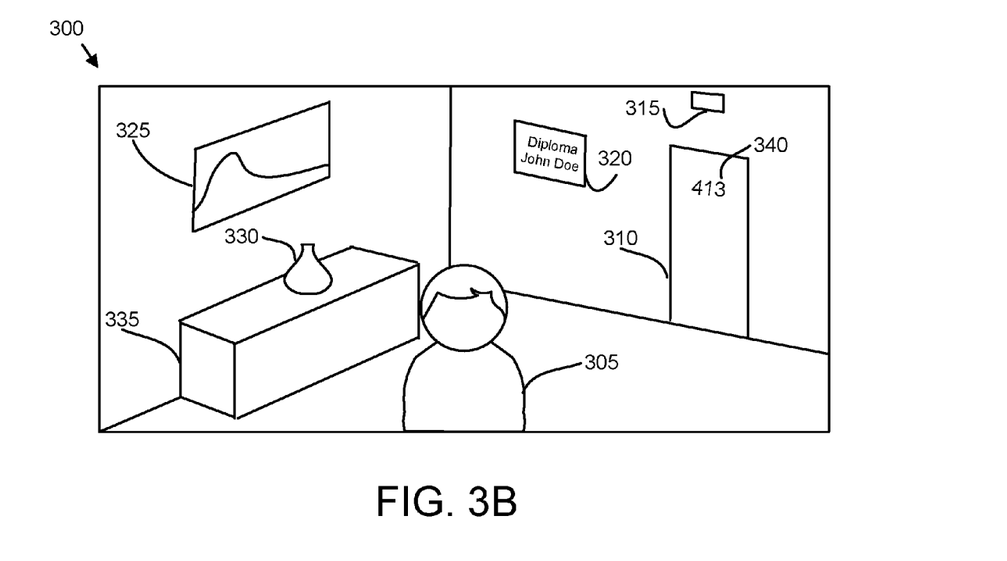
FIG. 3B is a drawing illustrating one embodiment of an image with reduced resolution.

FIG. 3B is a drawing illustrating one embodiment of the image 300 with reduced resolution. The image 300 of FIG.

3A is shown. However, the resolution of the image 300 may be reduced. For example, the resolution of the image may be reduced to 75 dpi. As a result, aspects of the image 300 may be less readily identifiable by a requester.

In one embodiment, the image 300 is modified by reducing the image resolution as a function of the relationship level 255. Table 1 illustrates one embodiment of image resolution as a function of the relationship level 255.

TABLE 1

| Relationship Level | Image Resolution |
|---|---|
| Close Relationship | 100% |
| Family Relationship | 75-50% |
| Acquaintance Relationship | 50-25% |
| Public Relationship | <25% |

In one embodiment, the image resolution may be calculated as a function of the interaction score 235. The image resolution IR may be calculated using Equation 2, where k3 is a nonzero constant.

$$IR = k3 * IS \qquad \text{Equation 2}$$

Figure 3C:
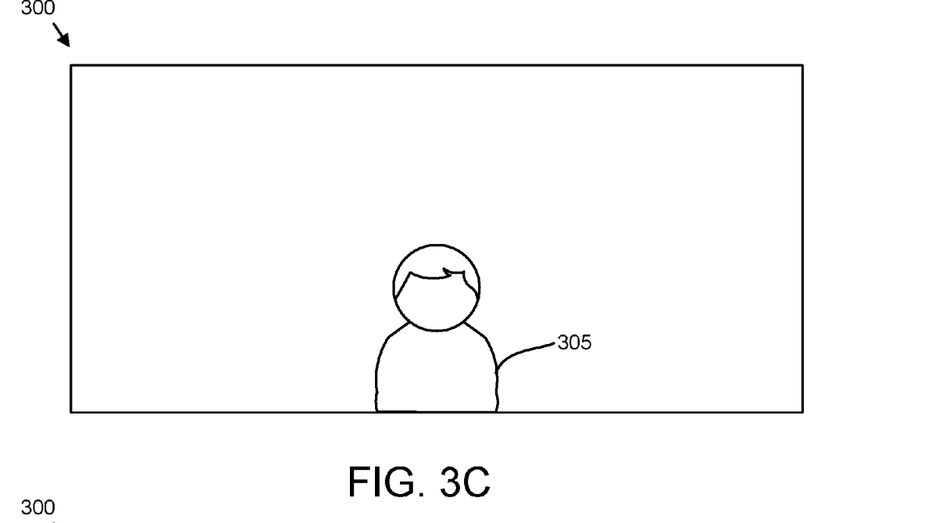
FIG. 3C is a drawing illustrating one embodiment of an image with an obscured background.

FIG. 3C is a drawing illustrating one embodiment of the image 300 with an obscured background. The image 300 of FIG. 3A is shown with the background elements obscured. In one embodiment, the background elements are obscured by removing the background elements from the image 300 and/or applying an opaque filter to the background elements. In addition, the resolution of the background is reduced while the resolution of the subject 305 is not reduced.

The image 300 may be modified by obscuring the background as a function of the relationship level 255. Table 3 illustrates one embodiment of background resolution and an opaque filter strength as a function of the relationship level 255.

TABLE 3

| Relationship Level | Background Resolution | Background Filter Strength |
|---|---|---|
| Close Relationship | 100% | 0% |
| Family Relationship | 75-50% | 25-50% |
| Acquaintance Relationship | 50-25% | 50-75% |
| Public Relationship | <25% | >75% |

Figure 3D:
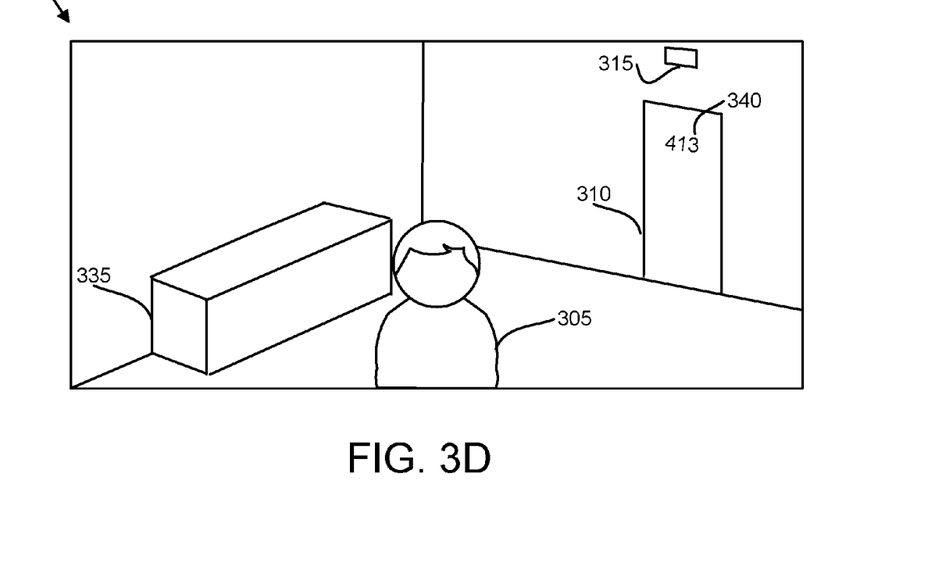
FIG. 3D is a drawing illustrating one embodiment of an image with removed objects.

FIG. 3D is a drawing illustrating one embodiment of the image 300 with removed objects. The image 300 of FIG. 3A is shown with selected objects removed from the image 300. In the depicted embodiment, the picture 325, the decanter 330, and the diploma 320 are removed from the image 300.

The image 300 may be modified by removing one or more specified objects as a function of the relationship level 255. Table 4 illustrates one embodiment of objects that are removed as a function of the relationship level 255.

TABLE 4

| Relationship Level | Objects Removed |
|---|---|
| Close Relationship | None |
| Family Relationship | Content Related |
| Acquaintance Relationship | Location, Time, and Content Related |
| Public Relationship | Location, Time, Content, and Context Related |

Figure 3E:
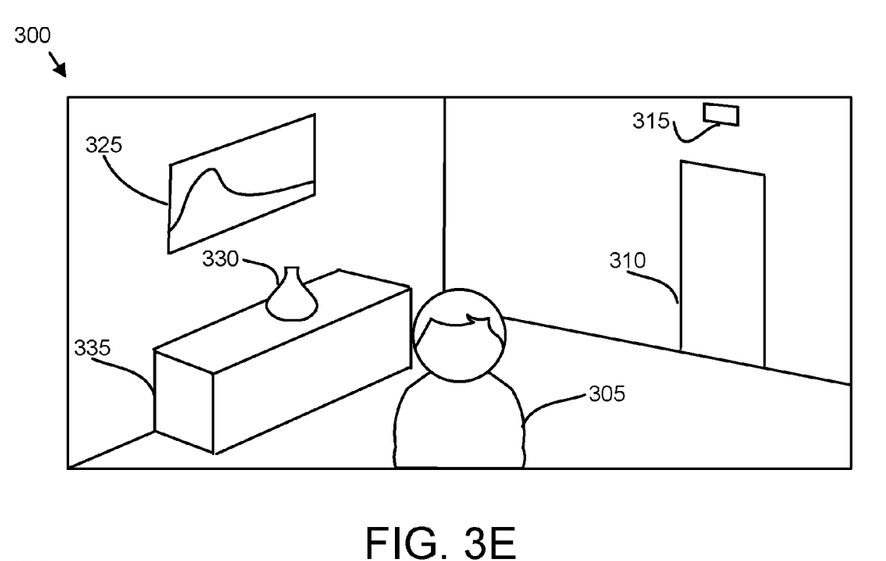
FIG. 3E is a drawing illustrating one embodiment of an image with removed identifiers.

FIG. 3E is a drawing illustrating one embodiment of the image 300 with removed identifiers. The image 300 of FIG. 3A is shown with one or more identifiers such as identifying objects removed from the image 300. In the depicted embodiment, the diploma 320 and the room number 340 are removed from the image 300.

The image 300 may be modified by removing one or more identifiers as a function of the relationship level 255. Table 5 illustrates one embodiment of identifiers that are removed as a function of the relationship level 255.

TABLE 5

| Relationship Level | Identifiers Removed |
|---|---|
| Close Relationship | None |
| Family Relationship | Time Related |
| Acquaintance Relationship | Location and Time Related |
| Public Relationship | Location, Time, and Context Related |

Figure 3F:
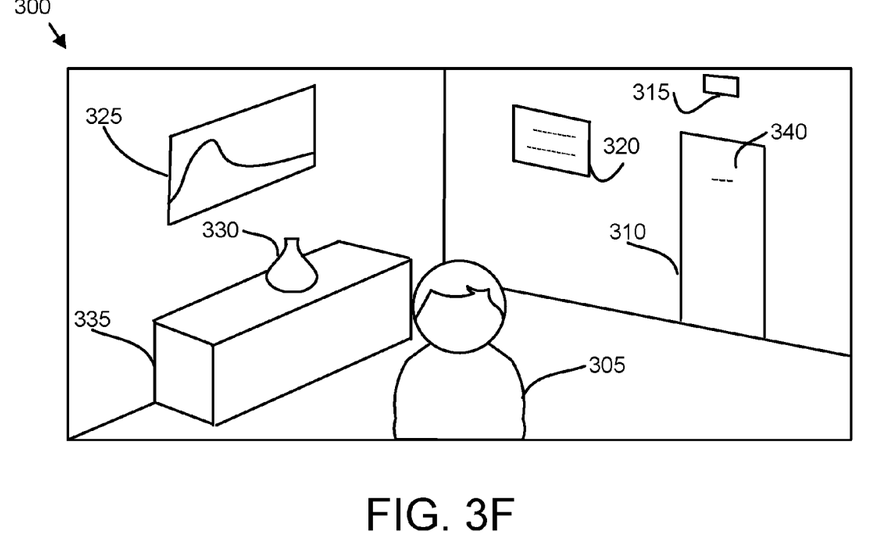
FIG. 3F is a drawing illustrating one embodiment of an image with redacted text.

FIG. 3F is a drawing illustrating one embodiment of the image 300 with redacted text. The image 300 of FIG. 3A is shown with redacted text. In the depicted embodiment, the text of the diploma 320 and the room number 340 is redacted.

The image 300 may be modified by redacting text as a function of the relationship level 255. Table 6 illustrates one embodiment of redacting text as a function of the relationship level 255.

TABLE 6

| Relationship Level | Redacted Text |
|---|---|
| Close Relationship | None |
| Family Relationship | Blacklist Text |
| Acquaintance Relationship | All Text Except Whitelist Text |
| Public Relationship | All Text |

For example, if the relationship level 255 is a family relationship, only specified blacklist text may be redacted. A user may create the blacklist. However, if the relationship level 255 is an acquaintance relationship level, all text may be redacted except specified whitelist text. The user may create the whitelist.

Figure 4:
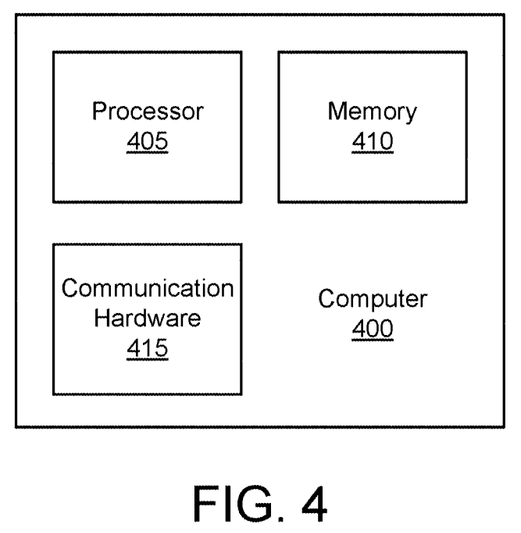
FIG. 4 is a schematic block diagram illustrating one embodiment of a computer.

FIG. 4 is a schematic block diagram illustrating one embodiment of a computer 400. The computer 400 may be embodied in the image controller 105. In the depicted embodiment, the computer 400 includes a processor 405, a memory 410, and communication hardware 415. The memory 410 may include a semiconductor storage device, hard disk drive, an optical storage device, a micromechanical storage device, or combinations thereof. The memory 410 may store code. The processor 405 may execute the code. The communication hardware 415 may communicate with other devices such as the network 115.

Figure 5:
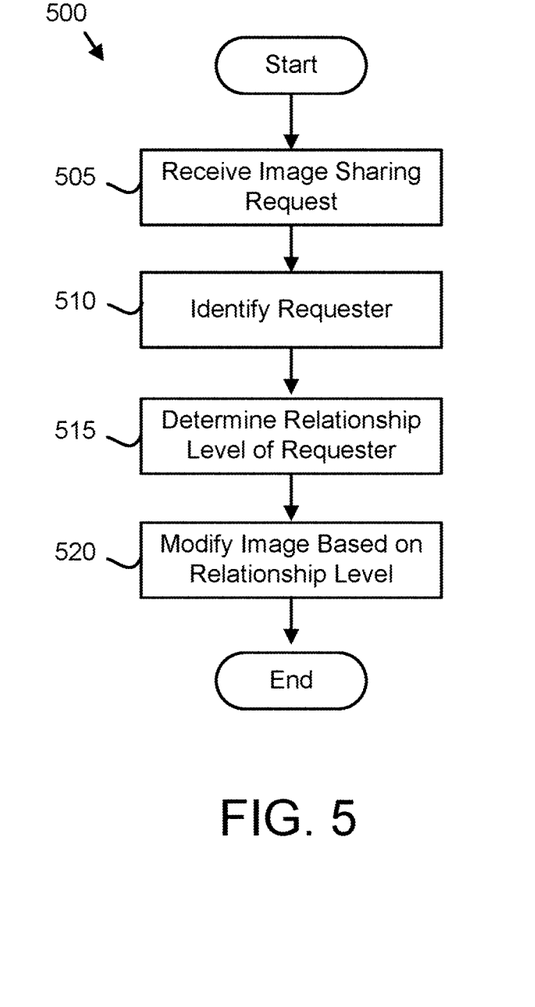
FIG. 5 is a schematic flow chart diagram illustrating one embodiment of a relationship-based image modification method.

FIG. 5 is a schematic flow chart diagram illustrating one embodiment of a relationship-based image modification method 500. The method 500 may modify the image 300 based on the relationship level 255 for a requester of the image 300. The method 500 may be performed by the processor 405.

The method 500 starts, and in one embodiment, the processor 405 receives 505 an image sharing request from a requester. The requester may communicate the image sharing request from the requesting device 125 to the image controller 105. The image sharing request may be a request for specified image 300, a request for a general stream of information that includes the image 300, a request for information related to the submitter and/or a subject, and the like. In one embodiment, the image sharing request is a search directed to the submitter and/or a subject. Alternatively, the image sharing request may be a search directed to an aspect of the image 300.

The processor 405 may identify 510 the requester. In one embodiment, the requester is identified from the requester identifier 220 in the requester data 215.

The processor 405 may determine 515 the relationship level 255 of the requester. In one embodiment, the processor 405 calculates the interaction score 235 for the requester. The processor 405 may use Equation 1 to calculate the interaction score 235 as a function of the interaction history 230. In addition, the processor 405 may determine 515 the relationship level 255 from the interaction score 235.

In one embodiment, each user such as a submitter and/or subject specifies the relationship level 255 for the requester and the relationship level 255 is recorded in an entry 251 corresponding to the user's user identifier 250.

The processor 405 may modify 520 the image 300 based on the relationship level 255 and the method 500 ends. In one embodiment, the relationship level 255 for the submitter and each subject of the image 300 is used to determine the relationship permissions 240.

The processor 405 may employ the most restrictive relationship level 255 of the relationship permissions 240 to modify 520 the image 300. For example, if the submitter has a close relationship with the requester and a subject has an acquaintance relationship with the requester, the modifications to the image 300 may be based on the acquaintance relationship.

Alternatively, the processor 405 may employ that relationship level 255 of the submitter from the relationship permissions 240. For example, if the submitter has a close relationship with the requester and a subject has an acquaintance relationship with the requester, the modifications to the image 300 may be based on the close relationship. In one embodiment, if the relationship level 255 of a subject is more restrictive than a relationship level 255 of the submitter, the modifications to the image 300 may be based on the relationship level 255 of the submitter and the subject may be removed from and/or obscured in the image 300.

In one embodiment, the image 300 is modified by reducing image resolution as a function of the relationship level 255 as shown in FIG. 3B. In addition, the image 300 may be modified by obscuring the background as a function of the relationship level 255 as illustrated in FIG. 3C. The image 300 may also be modified by removing specified objects as a function of the relationship level 255 as shown in FIG. 3D. In a certain embodiment, the image 300 is modified by removing identifiers as a function of the relationship level 255 as illustrated in FIG. 3E. The image 300 may be further modified by redacting text as a function of the relationship level 255 as illustrated in FIG. 3F.

The embodiments determine the relationship level 255 of a requester and modify an image 300 based on the relationship level 255. As a result, aspects of the image 300 may not be provided to a requester with which the submitter of the image 300 and/or subjects of the image 300 do not have a sufficiently close relationship.

For example, the subject of an image 300 may employ the embodiments to prevent a requester with which the subject has only a public relationship from determining aspects such as a location, time, and/or context from the image 300. As a result, the subject's privacy is protected.

The embodiments may allow submitters and/or subjects to make more images 300 available through the system 100 while preventing some aspects of the images 300 from being disseminated. As a result, submitters and/or subjects may make more images 300 available.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
  an image storage system that stores a plurality of images;
  a processor;
  a memory that stores code executable by the processor to:
    determine a relationship level for a requester of an image of the plurality of images, wherein the relationship level is selected from the group consisting of a close relationship level, a family relationship level, an acquaintance relationship level, and a public relationship level and is calculated as a function of an interaction score calculated from an interaction history between a user and the requester and the interaction history comprises one or more of a number of communications from the user to the requester, a number of times the requester appears as a subject in images related to the user, and a number of views of images related to the user by the requester and the image is further modified by removing a specified object as a function of the relationship level; and
    modify the image based on the relationship level by removing objects that indicate content, location, and time.

2. The apparatus of claim 1, wherein the image is further modified by reducing image resolution as a function of the relationship level.

3. The apparatus of claim 1, wherein the image is further modified by obscuring a background as a function of the relationship level.

4. The apparatus of claim 1, wherein the image is further modified by removing identifiers as a function of the relationship level.

5. The apparatus of claim 1, wherein the image is further modified by redacting text as a function of the relationship level.

6. A method comprising:
  determining, by use of a processor, a relationship level for a requester of an image of a plurality of images, wherein the relationship level is selected from the group consisting of a close relationship level, a family relationship level, an acquaintance relationship level, and a public relationship level and is calculated as a function of an interaction score calculated from an interaction history between a user and the requester and the interaction history comprises one or more of a number of communications from the user to the requester, a number of times the requester appears as a subject in images related to the user, and a number of views of images related to the user by the requester; and modifying the image based on the relationship level by removing objects that indicate content, location, and time.

7. The method of claim 6, wherein the image is further modified by reducing image resolution as a function of the relationship level.

8. The method of claim 6, wherein the image is further modified by obscuring a background as a function of the relationship level.

9. The method of claim 6, wherein the image is further modified by removing identifiers as a function of the relationship level.

10. The method of claim 6, wherein the image is further modified by redacting text as a function of the relationship level.

11. A program product comprising a non-transitory computer readable storage medium that stores code executable by a processor, the executable code comprising code to perform:

determining a relationship level for a requester of an image of a plurality of images, wherein the relationship level is selected from the group consisting of a close relationship level, a family relationship level, an acquaintance relationship level, and a public relationship level and is calculated as a function of an interaction score calculated from an interaction history between a user and the requester and the interaction history comprises one or more of a number of communications from the user to the requester, a number of times the requester appears as a subject in images related to the user, and a number of views of images related to the user by the requester; and modifying the image based on the relationship level by removing objects that indicate content, location, and time.

12. The program product of claim 11, wherein the image is further modified by reducing image resolution as a function of the relationship level.

13. The program product of claim 11, wherein the image is further modified by obscuring a background as a function of the relationship level.

* * * * *